Nov. 20, 1951   G. B. STILLWAGON, JR   2,575,602
UNIVERSAL JOINT OF THE JAW TYPE
Filed Aug. 18, 1947   2 SHEETS—SHEET 1
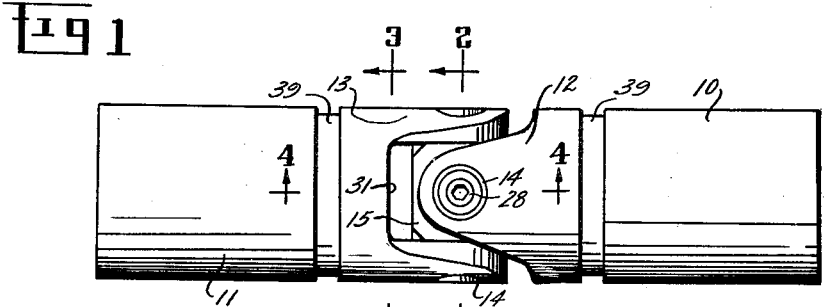
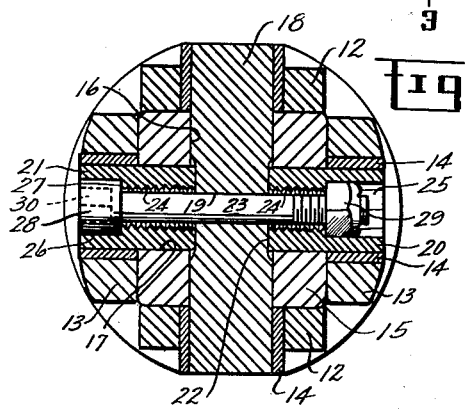
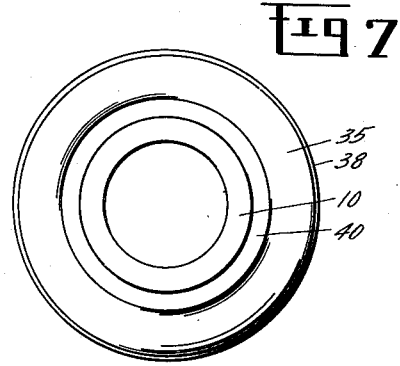
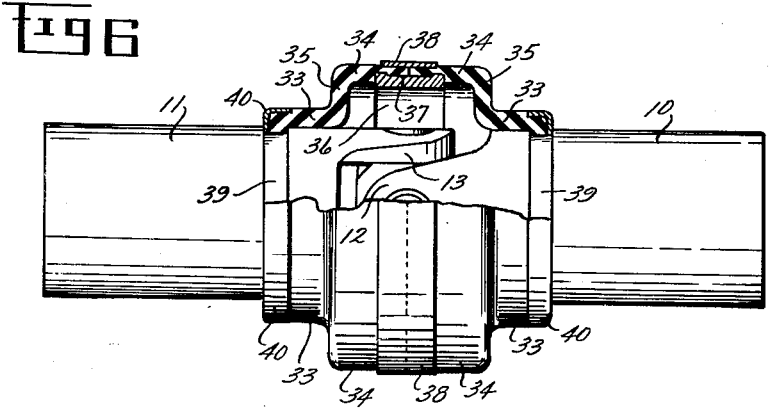
INVENTOR.
GEORGE B. STILLWAGON JR.
BY
ATTORNEY Nov. 20, 1951 G. B. STILLWAGON, JR 2,575,602
UNIVERSAL JOINT OF THE JAW TYPE
Filed Aug. 18, 1947 2 SHEETS—SHEET 2
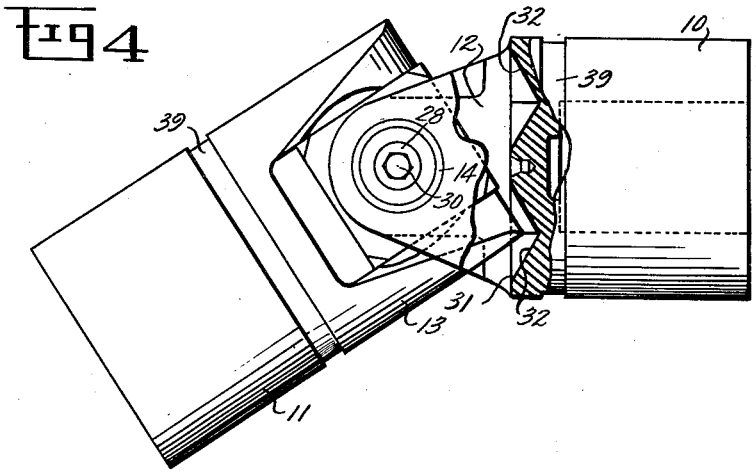
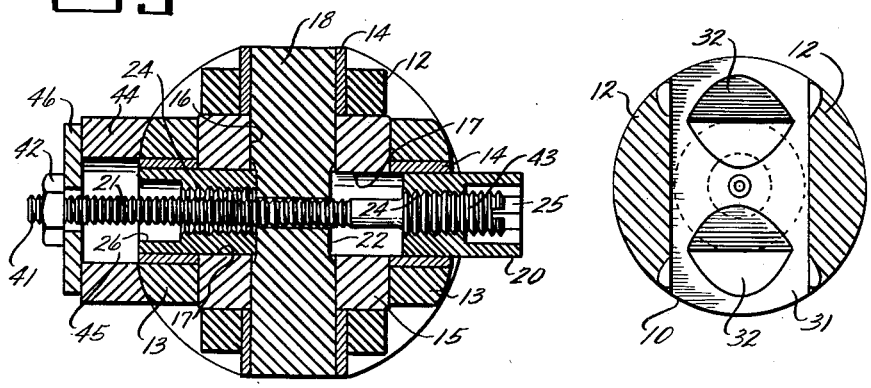
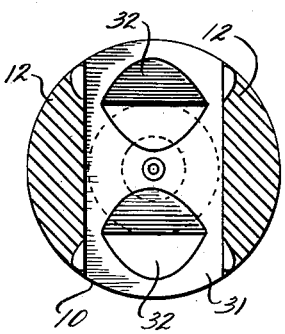
INVENTOR.
GEORGE B. STILLWAGON JR.
BY
ATTORNEY—

Patented Nov. 20, 1951

2,575,602

UNITED STATES PATENT OFFICE 2,575,602

UNIVERSAL JOINT OF THE JAW TYPE

George B. Stillwagon, Jr., Dayton, Ohio, assignor of one-half to Kenneth G. Fraser, Dayton, Ohio Application August 18, 1947, Serial No. 769,088

3 Claims. (Cl. 64—17)

This invention relates to a universal joint of the jaw type and more particularly to a joint of the type shown in my Patent No. 2,369,810 of February 20, 1945.

One object of the invention is to provide such a universal joint from which the pivot pins may be easily removed.

A further object of the invention is to provide a universal joint of the type in which the jaws of one pair are connected with the pivot block by a single pivot pin and the jaws of the other pair are connected with the pivot block by separate pins, in which each of the separate pivot pins is provided with means to facilitate the insertion and removal thereof.

A further object of the invention is to provide such a joint which is simple in construction and of a strong durable character.

A further object of the invention is to provide a universal joint having relatively short and strong jaws and in which clearance is provided to permit a large relative movement of the coupling members about their pivotal connections.

A further object of the invention is to provide the joint with a two part flexible cover which can be easily manufactured and applied to joints of large diameter.

Other objects of the invention may appear as the device is described in detail.

In the accompanying drawings Fig. 1 is a side elevation of a universal joint embodying the invention; Fig. 2 is a transverse section taken on the line 2—2 of Fig. 1; Fig. 3 is a transverse section taken on the line 3—3 of Fig. 1; Fig. 4 is a side elevation of the joint, partly broken away, and showing the coupling members in angular relation one to the other; Fig. 5 is a section similar to Fig. 2 showing a pivot pin inserting and removing implement attached to the joint; Fig. 6 is a side elevation, partly in section, of a universal joint with a cover applied thereto; and Fig. 7 is an end elevation of the joint of Fig. 6.

In these drawings I have illustrated one embodiment of the invention but it is to be understood that the joint as a whole, as well as the several parts thereof, may take various forms without departing from the spirit of the invention.

In the particular embodiment here illustrated the joint comprises two coupling members 10 and 11 arranged end to end, each having at its inner end a pair of jaws, 12 and 13, arranged in planes intersecting the planes of the jaws of the other coupling member. The jaws of each pair are provided with alined bearing openings which in the present instance are provided with bushings 14. A connecting or pivot block 15 is supported between the jaws of both pairs of jaws and is provided with intersecting bores 16 and 17 in line with the bearing openings of the respective pairs of jaws. The jaws 12 of the coupling member 10 are pivotally connected with the block 15 by a single relatively long pivot pin 18 which extends through one of the bores in the block, in the present instance the bore 16, and through the bearing openings of the jaws 12. This pivot pin is provided with a transverse opening 19 in line with the other bore 17 of the pivot block. The jaws 13 of the coupling member 11 are separately connected with the block by relatively short pivot pins 20 and 21 which extend through the bearing openings in those jaws and fit tightly in respective end portions of the bore 17. Preferably the long pin 18 is provided adjacent the short pivot pins 20 and 21 with flattened surfaces 22 with which the inner ends of the short pins contact. The short pins are provided with longitudinal openings in line with the opening 19 in the long pin, and a connecting element 23 extends through the openings in the pins.

Universal joints of this general type are well known but as heretofore made they have been of such a character that it is very difficult to disassemble the joint by removing the pivot pins. Heretofore the connecting element 23 was in the nature of a long rivet which extended through and beyond the short pivot pins and the ends of which were upset against the ends of those pins to rigidly retain the several pins in their proper relative positions. To disassemble such a joint it was necessary to first cut off one upset end of the rivet. When the rivet had been removed the long pin could be driven out of the connecting block and the inclined portions of the flat surface 22 would impart a slight outward movement to the short pivot pins but would not move them outwardly far enough to enable the same to be easily removed, and the complete removal thereof was difficult and was very apt to result in the marring of the bearing surface thereof or otherwise damaging the pin or other parts of the joint. This type of construction has heretofore been used mainly, if not entirely, in small size joints which are relatively inexpensive and usually when a part of a joint became worn or was damaged it was preferable to discard the joint as a whole and replace the same with a new joint, because this was less expensive than the disassembling and replacing or repairing of the damaged part, and it could be accomplished much more quickly so that the machine in which the joint was used would be out of service for a much shorter time than would be required to repair the joint.

However, the present joint is made in large sizes some of which are several inches in diameter and which are very expensive. Consequently it is often preferable to disassemble the joint and repair or replace the damaged part thereof. For this purpose the connecting element 23 is in the nature of a bolt which extends through the openings in the three pivot pins and can be quickly and easily inserted and removed, and the longitudinal opening in each short pivot pin comprises an inner screw threaded portion 24 in line with the opening 19 in the long pivot pin and of a diameter slightly greater than the diameter of the bolt. The outer portion, 25 and 26, of each opening is of a diameter somewhat larger than the diameter of the inner portion thereof, thus providing in the opening an outwardly facing shoulder 27 against which the head 28 and nut 29 of the bolt respectively engage. Preferably the outer end 25 of the opening in the pivot pin 20 is non-circular and adapted to receive a nut of the same shape and hold the nut against rotation. The outer end portion 26 of the opening in pivot pin 21 is cylindrical to receive the cylindrical head 28 of the bolt. The head 28 is provided with a non-circular socket 30 or like means whereby an implement may be applied thereto to rotate the shank of the bolt in the nut and thus draw the short pivot pins inwardly into engagement with the long pivot pin and firmly retain the same in such engagement. The nut may be of any well known self-locking type which will not be loosened by vibration and from which the shank of the bolt may be removed by rotation thereof. This construction enables the pivot pins to be inserted and removed by the use of a simple, easily operated implement having a threaded portion to engage the threaded opening in the pivot pin which is to be inserted or removed. Such an implement may take various forms and one form thereof is shown in Fig. 5. As there shown the implement comprises a rod 21 the major portion of which is of a diameter which permits it to be inserted through the opening in the long pivot pin 18 and is threaded to receive a nut 42. That end of the rod opposite the nut is enlarged and threaded as shown at 43 to enable it to be screwed into the threaded opening 24 in either pivot pin. When a pivot pin is to be inserted the threaded portion 43 of the rod is screwed into the opening 24 in the pivot pin from the inner end of the latter and the small diameter portion of the rod is inserted through the bore 17 in the pivot block 15 and through the transverse opening in the long pivot pin, the rod being of such a length that it will extend through and beyond the jaw opposite the jaw in which the pin is to be inserted. The inner end of the pivot pin 20 is supported in line with the bushing 14 of the adjacent jaw 13, preferably by partially inserting the same therein. A block or spacing member 44 is placed about that end of the rod which projects beyond the other jaw 13 and is provided with an opening 45 of a diameter at least equal to the internal diameter of the adjacent bushing 14. An apertured plate, or heavy washer, 46 is placed about the rod in contact with the outer side of the spacing member 44 and the nut 42 is then threaded onto the rod and turned up to clamp the spacing member 44 in engagement with the jaw. A wrench, or the like, is then applied to the nut 42 and the latter rotated to move the rod lengthwise in a direction to draw the pivot pin 20 into the bore of the coupling member and into firm contact with the long pivot pin. In the arrangement shown in Fig. 5 the second pivot pin 21 had been previously inserted, in the manner above described, the operation being the same for inserting either pin. When a pivot pin is to be removed the enlarged end 43 of the rod is inserted in the pivot pin from the outer end of the latter and threaded into the opening thereof with the small diameter part of the rod extending outwardly beyond the adjacent jaw. The spacing member 44 and the washer 46 are then placed about the rod in the manner above described and the nut actuated to move the rod outwardly and thus withdraw the pivot pin from the pivot block and from the jaw.

In a universal joint of the jaw type it is necessary that the connecting block be spaced from the transverse surface of each coupling member, between the jaws, such a distance as to permit a relatively large angular displacement of the coupling members with relation one to the other. The provision of such clearance requires the use of relatively long jaws and the longer the jaw the lower its strength. In the present device the transverse surface 31 of each coupling member is recessed to receive the ends of the jaws of the other coupling members as the two members approach the limit of their relative angular movement. Consequently, the jaws are much shorter than the jaws of corresponding joints of the old type and have a correspondingly greater strength. In the arrangement shown in Figs. 3 and 4 the transverse surface 31 is provided with two recesses 32 arranged in line with the respective jaws of the other coupling member, so that when the angular displacement of the coupling members approaches its limit the end portions of the jaws of one coupling member will enter the corresponding recesses in the other coupling member and permit the completion of the angular movement of the coupling members. The use of two relatively small recesses enables the desired clearance to be provided by the removal of a small portion only of the metal of each coupling member and the coupling member is not materially weakened.

It is also desirable to provide a joint of this kind with a flexible cover to contain a lubricant and to exclude dirt. In Fig. 6 there is shown a type of cover which is well adapted for use on large size joints and which can be easily manufactured. The cover is tubular in form and is divided into two parts or members of substantially equal length. The outer end portion 33 of each member of the cover is of a diameter approximating the diameter of the barrels of the coupling members and the inner portion 34 of each member is of a diameter substantially greater than the diameter of the outer portion and is connected thereto by an approximately radial portion 35. An annular band 36 of rigid material, preferably metal, is arranged within the larger portions of the cover in overlapping relation thereto and is provided with a circumferential recess or channel 37. An exterior band 38 extends about and overlaps the adjacent ends of the larger portions of the two members of the cover and this band is radially compressed on the end portions of the two members to force parts of the inner surface thereof into the channel 37 in the inner band 36 and thus firmly connect the two members of the cover one with the other. The outer end portions of the two members overlap circumferential grooves 39 in the respective coupling members and are pressed into and firmly secured in those grooves by radially compressed attaching members 40.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent is:

1. In a universal joint of the type which comprises two coupling members arranged end to end and each having at one end a pair of jaws in planes intersecting the planes of the jaws of the other member, the jaws of each pair having alined bearing openings, and a connecting block mounted between the jaws of both pairs and having intersecting bores in line with the openings in the jaws of the respective coupling members, a relatively long pivot pin extending through one of said bores in said block and through the bearing openings in the corresponding pair of jaws, said pivot pin having a transverse opening in line with the other bore of said block, separate relatively short pivot pins extending through the openings in the other pair of jaws and fitting tightly in the corresponding ends of the last mentioned bore ind said block, each of said short pins having therein a longitudinal screw threaded opening in line with the opening in said long pin and of a diameter greater than the diameter of that opening, and a bolt in the openings in the three pivot pins with its head and nut in engagement with outwardly facing parts of the respective short pins.

2. In a universal joint of the type which comprises two coupling members arranged end to end and each having at one end a pair of jaws in planes intersecting the planes of the jaws of the other member, the jaws of each pair having alined bearing openings, and a connecting block mounted between the jaws of both pairs and having intersecting bores in line with the openings in the jaws of the respective coupling members, a relatively long pivot pin extending through one of said bores in said block and through the bearing openings in the corresponding pair of jaws, said pivot pin having a transverse opening in line with the other bore of said block, separate relatively short pivot pins extending through the openings in the other pair of jaws and fitting tightly in the corresponding ends of the last mentioned bore in said block, each short pin having therein a longitudinal opening the inner portion of which is screw threaded and the outer portion of which is of a diameter greater than the diameter of said screw threaded portion, and a bolt in the openings of the three pins, said bolt being of a diameter less than the diameter of the screw threaded portions of the openings in said short pins and having its head and nut in the large diameter portions of the respective short pins.

3. In a universal joint of the type which comprises two coupling members arranged end to end and each having at one end a pair of jaws in planes intersecting the planes of the jaws of the other member, the jaws of each pair having alined bearing openings, and a connecting block mounted between the jaws of both pairs and having intersecting bores in line with the openings in the jaws of the respective coupling members, a relatively long pivot pin extending through one of said bores in said block and through the bearing openings in the corresponding pair of jaws, said pivot pin having a transverse opening in line with the other bore of said block, separate relatively short pivot pins extending through the openings in the other pair of jaws and fitting tightly in the corresponding ends of the last mentioned bore in said block, each of said short pins having a longitudinal opening in line with the transverse opening in said long pin, a removable connecting element in the openings in the three pins, the opening in each of said short pins being provided with a screw threaded portion of a diameter greater than the diameter of said connecting element to receive a screw threaded pin removing implement when said connecting element has been removed.

GEORGE B. STILLWAGON, Jr.

REFERENCES CITED

The following references are of record in the file of this patent:

UNITED STATES PATENTS

| Number | Name | Date |
|---|---|---|
| 597,506 | Murkland | Jan. 18, 1898 |
| 699,904 | Warren | May 13, 1902 |
| 1,020,476 | Bocorselski | Mar. 19, 1912 |
| 1,271,615 | Ranger | July 9, 1918 |
| 1,385,452 | Woffman | July 26, 1921 |
| 1,926,858 | Peters | Sept. 12, 1933 |
| 2,264,728 | Stillwagon, Jr. et al. | Dec. 2, 1941 |
| 2,369,810 | Stillwagon, Jr. | Feb. 20, 1945 |